(12) United States Patent
Cross

(10) Patent No.: US 10,244,784 B2
(45) Date of Patent: Apr. 2, 2019

(54) ROOT CROP WASHER

(76) Inventor: Simon Cross, County Kildare (IE)

( * ) Notice: Subject to any disclaimer, the term of this patent is extended or adjusted under 35 U.S.C. 154(b) by 568 days.

(21) Appl. No.: 14/004,479

(22) PCT Filed: Mar. 12, 2012

(86) PCT No.: PCT/EP2012/054296
§ 371 (c)(1),
(2), (4) Date: Nov. 20, 2013

(87) PCT Pub. No.: WO2012/123424
PCT Pub. Date: Sep. 20, 2012

(65) Prior Publication Data
US 2014/0069471 A1  Mar. 13, 2014

(30) Foreign Application Priority Data
Mar. 11, 2001 (IE) .................................. S2011/0118

(51) Int. Cl.
*A23N 12/02* (2006.01)
*A01D 33/04* (2006.01)
*A01D 33/08* (2006.01)

(52) U.S. Cl.
CPC ........... *A23N 12/026* (2013.01); *A01D 33/04* (2013.01); *A01D 33/08* (2013.01)

(58) Field of Classification Search
CPC ...... A23N 12/026; A01D 33/04; A01D 33/08; B08B 9/0933
USPC ....................................................... 134/147
See application file for complete search history.

(56) References Cited

U.S. PATENT DOCUMENTS

| 2,369,863 | A |   | 2/1945 | Sevey |
|---|---|---|---|---|
| 4,198,802 | A | * | 4/1980 | Hengen ................. A01F 12/442 460/67 |
| 4,219,409 | A | * | 8/1980 | Liller ........................ B04C 5/02 137/561 A |
| 5,001,893 | A | * | 3/1991 | Stanley ................ A01D 51/002 56/16.5 |

FOREIGN PATENT DOCUMENTS

| DE | 20 16 968 | 12/1970 |
|---|---|---|
| DE | 20 2009 014553 | 1/2010 |
| EP | 0 401 812 | 12/1990 |
| EP | 0 568 489 | 11/1993 |
| EP | 0 715 815 | 6/1996 |

(Continued)

*Primary Examiner* — Michael E Barr
*Assistant Examiner* — Tinsae B Ayalew

(57) ABSTRACT

A root crop washer has a rotatable washing drum which is partially immersed in a water trough, and a stone separator mounted before an inlet of the drum. A loading hopper is provided for delivering a root crop to the stone separator. An elevator is mounted at an outlet of the washing drum for discharge of cleaned produce from an outlet of the washing drum. Rotating paddles within the stone separator impart a swirling motion about a vertical axis to water in the stone separator. The root crop is supported by the water and moved around an inner sidewall of the stone separator between an inlet and an outlet of the stone separator. At the same time unwanted heavier material such as stones and clay falls downwardly through the stone separator for discharge through a waste outlet at a bottom of the stone separator.

14 Claims, 10 Drawing Sheets

(56) References Cited

FOREIGN PATENT DOCUMENTS

| | | | |
|---|---|---|---|
| EP | 0811428 A2 * | 12/1997 | ............. B03B 5/623 |
| FR | 2 213 024 | 8/1974 | |
| GB | 938 526 | 10/1963 | |
| GB | 987 908 | 3/1965 | |
| WO | 01/26489 | 4/2001 | |

* cited by examiner

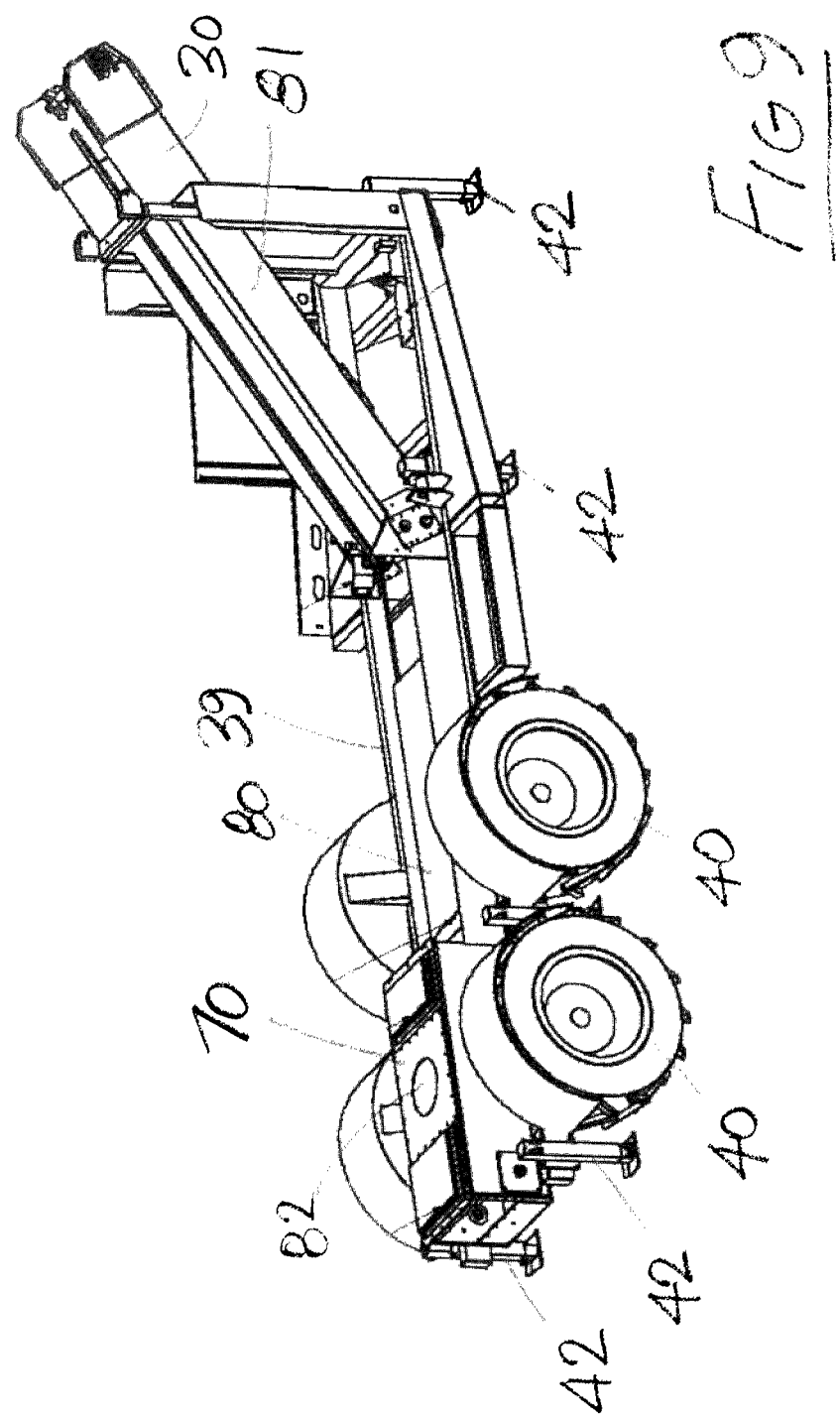

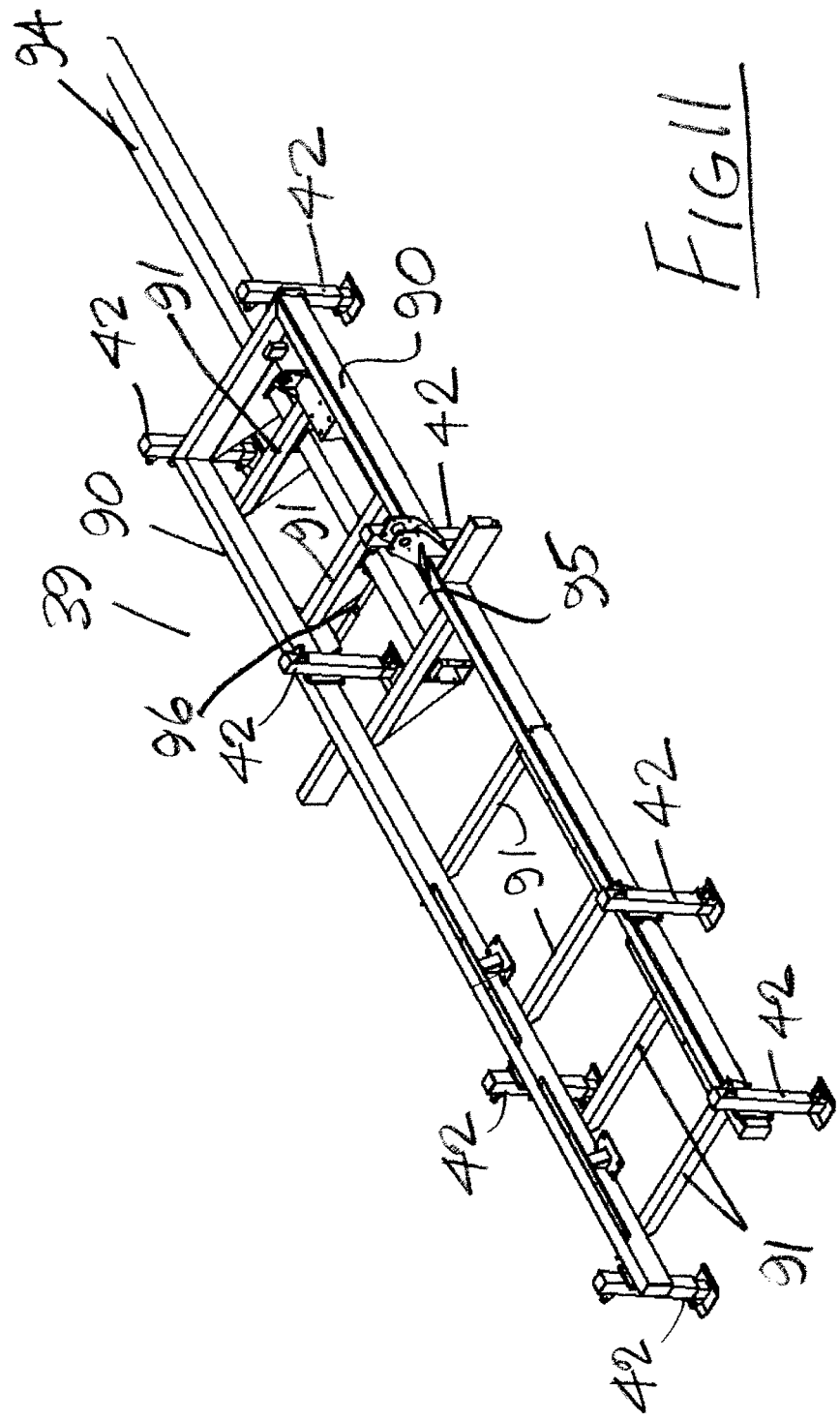

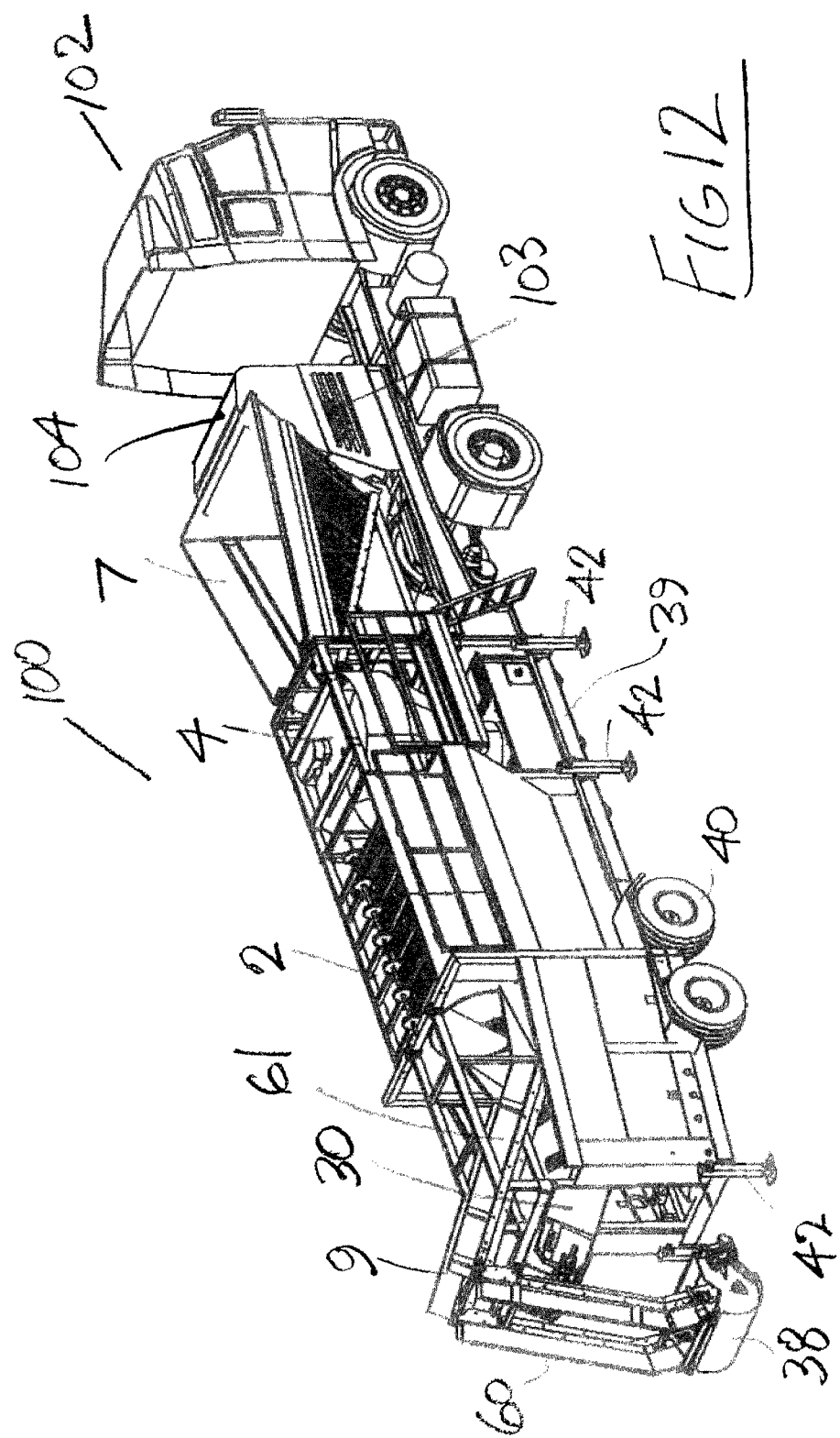

ROOT CROP WASHER

INTRODUCTION

This invention relates to a root crop washer.

The invention particularly relates to a root crop washer of the type comprising a rotatable washing drum which is partially immersed in a water trough and an associated stone separator mounted before an inlet of the drum. A root crop washer of this type is described in my previous patent specification publication No. EP 0568489. A problem arises with the removal of stones and unwanted clay materials from the unwashed root crop in that the de-stoning apparatus provided to date has only been of limited success. The present invention is directed towards overcoming this problem.

SUMMARY OF THE INVENTION

According to the invention there is provided a root crop washer including a root crop washing apparatus and a stone separator mounted at an inlet of the root crop washing apparatus, the stone separator comprising a separator housing having a root crop inlet and a root crop outlet spaced-apart from the root crop inlet, the root crop outlet communicating with the inlet of the root crop washing apparatus, and a first liquid stream generator for generating a first liquid stream within the separator housing travelling between the root crop inlet and the root crop outlet for delivery of the root crop from the inlet to the outlet. The stone separator advantageously provides an excellent separation of unwanted clay and stone materials from the root crop before delivery of the root crop to the washing apparatus.

In one embodiment the stone separator further includes a second liquid stream generator for generating a second liquid stream within the separator housing travelling upwardly through the separator housing. This aids in supporting the root crop within the separator housing and overspill carries the root crop to the washing drum. Preferably the water inlet is provided at a lower end of the separator housing and the water outlet is provided at a top of the separator housing.

In another embodiment of the invention the stone separator comprises a cyclonic separator with a vortex generator for swirling liquid within the separator housing for generating a vortex within the separator housing forming the first liquid stream. Advantageously the water carries the root crop outwardly by centrifugal action whilst the heavier stone and clay materials drop through the water to the bottom of the separator housing.

In another embodiment the first liquid stream generator comprises a paddle mounted on a rotor shaft within the separator housing, said rotor shaft being connected to a drive motor for rotation of the paddle within the separator housing for swirling liquid within the housing to form the first liquid stream.

In another embodiment the second liquid stream generator comprises a pump operable to circulate liquid upwardly through the separator housing between a liquid inlet at a lower end of the separator housing and a liquid outlet at an upper end of the separator housing.

In another embodiment the root crop outlet forms the liquid outlet.

In another embodiment the root crop washer includes a trough forming a liquid reservoir, the trough having a liquid outlet communicating with an inlet of the pump and the liquid outlet of the separator housing communicating with the trough.

In another embodiment the separator housing has a waste outlet at a bottom of the separator housing.

Conveniently a waste removal conveyor is mounted below the waste outlet. This prevents any undesirable build-up of waste materials at the outlet.

In another embodiment the waste removal conveyor is mounted within a water trough together, said waste removal conveyor having an outlet end for discharge of material carried by the conveyor outwardly of the water trough. Optionally, the cyclonic separator may also be mounted within the water trough.

In another embodiment the waste removal conveyor has outwardly extending spaced-apart paddles to engage and remove debris falling through the waste outlet.

In a further embodiment cyclone water restrictor flaps extend downwardly at the waste outlet and the paddles are deflectable to pass beneath said water restrictor flaps.

In a further embodiment a water pump is provided having an inlet communicating with an interior of the trough and an outlet connected to the water inlet on the separator housing for delivering the water stream upwardly through the separator housing.

In another embodiment the waste outlet of the separator housing forms the water inlet.

In a further embodiment the means for swirling water within the separator housing is a rotatable paddle which is rotatably mounted within the separator housing. Any other suitable mechanism for imparting a swirling motion to water within the separator housing may be used.

In another embodiment the separator housing has a frusto-conical side wall which narrows between a top and a bottom of the separator housing.

In another embodiment the washing apparatus comprises a rotatable washing drum which is partially immersed in a water trough, said washing drum having an inlet communicating with the water outlet of the separator housing.

In another embodiment a common trough is provided for the waste conveyor and the washing drum.

In another embodiment an elevator is mounted at an outlet of the washing drum. This conveniently transports the washed root crop away from the washer. For ease of transport the elevator may be foldable between a raised in-use position and a collapsed stored position. A chopper may be mounted at an outlet end of the elevator to chop the root crop if desired. For convenience this chopper may be movable on the elevator between an in-use position and a retracted stored position.

In a preferred embodiment the trough is mounted on a mobile chassis. Thus conveniently the root crop washer can be transported between root crop harvesting sites. In this regard the chassis may be provided with a draw-bar to facilitate towing the chassis. It is also envisaged that the root crop washer could be provided on an articulated trailer of the type for engagement with the fifth wheel coupling on a tractor vehicle.

Ideally the waste removal conveyor and elevator extend longitudinally on the chassis.

This provides a compact construction to facilitate transport by road.

In another aspect the invention provides a root crop stone separator apparatus including a separator housing, said separator housing having a root crop inlet and a root crop outlet spaced-apart from the root crop inlet, a first liquid stream generator for generating a first liquid stream within the separator housing travelling between the root crop inlet and the root crop outlet.

In a preferred embodiment the apparatus includes a second liquid stream generator for generating a second liquid stream within the separator housing travelling upwardly through the separator housing.

In another embodiment the first liquid stream generator comprises a paddle mounted on a rotor shaft within the separator housing, said rotor shaft being connected to a drive motor for rotation of the paddle within the separator housing for swirling liquid within the housing to form the first liquid stream.

In another embodiment the second liquid stream generator comprises a pump operable to circulate liquid upwardly through the separator housing between a liquid inlet at a lower end of the housing and a liquid outlet at an upper end of the housing.

In another embodiment the root crop outlet forms the liquid outlet.

In a further embodiment the apparatus includes a trough forming a liquid reservoir, the trough having a liquid outlet communication with an inlet of the pump and the liquid outlet of the separator housing communicating with the trough.

In another embodiment the separator housing has a waste outlet at a lower end of the separator housing.

In a further embodiment a waste removal conveyor is mounted below the waste outlet.

BRIEF DESCRIPTION OF THE DRAWINGS

The invention will be more clearly understood by the following description of some embodiments thereof, given by way of example only with reference to the accompanying drawings, in which:

FIG. 9 is a detail perspective view showing a chassis and waste conveyor forming portion of the root crop washer of FIG. 4;

FIG. 11 is a detail perspective view of a chassis of the root crop washer of FIG. 4; and FIG. 12 is a perspective view of another root crop washer according to a third embodiment of the invention.

DETAILED DESCRIPTION OF PREFERRED EMBODIMENTS

Figure 1:
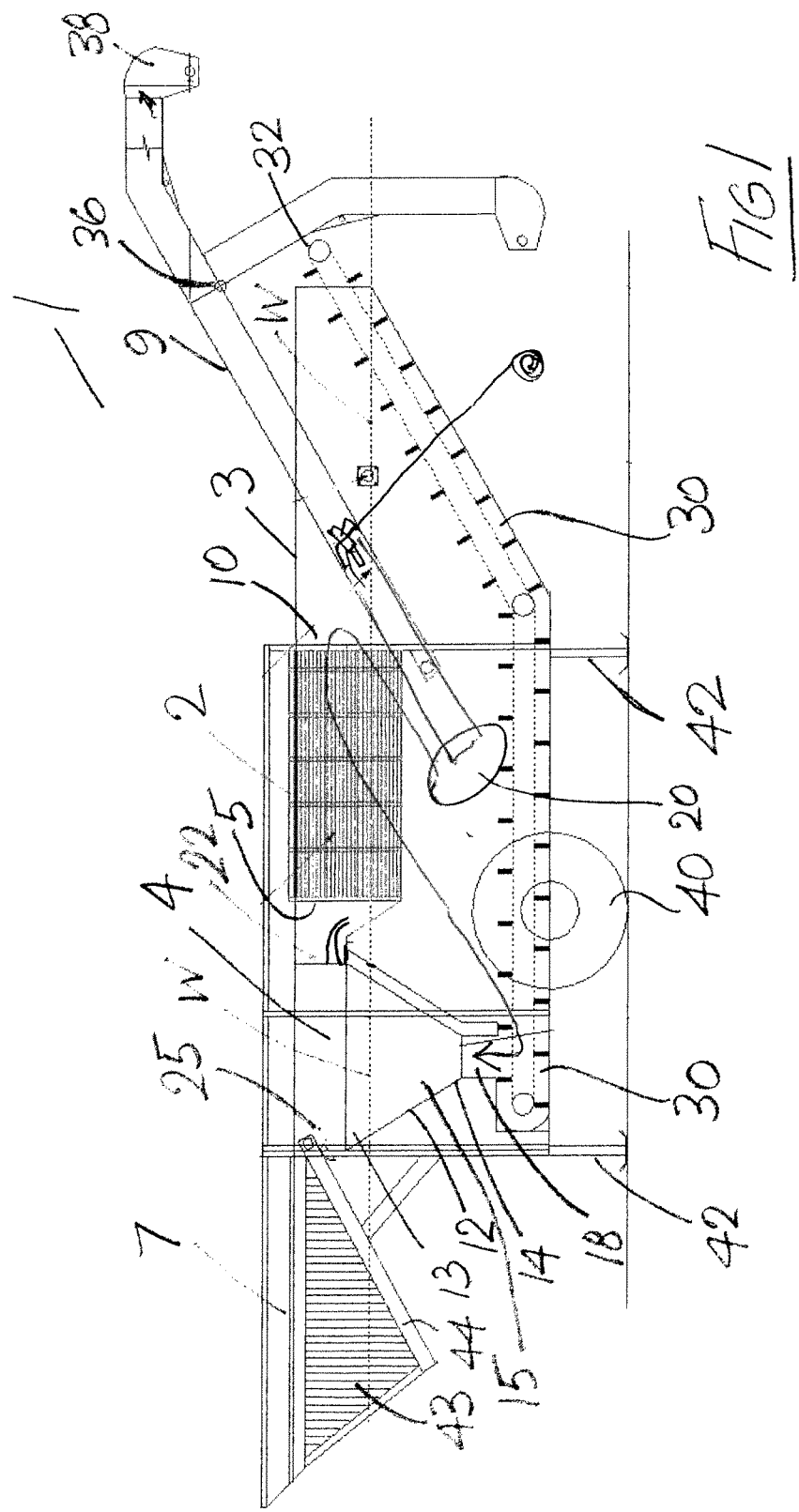
FIG. 1 is a side, partially sectioned elevational view of a root crop washer according to the invention.
Figure 2:
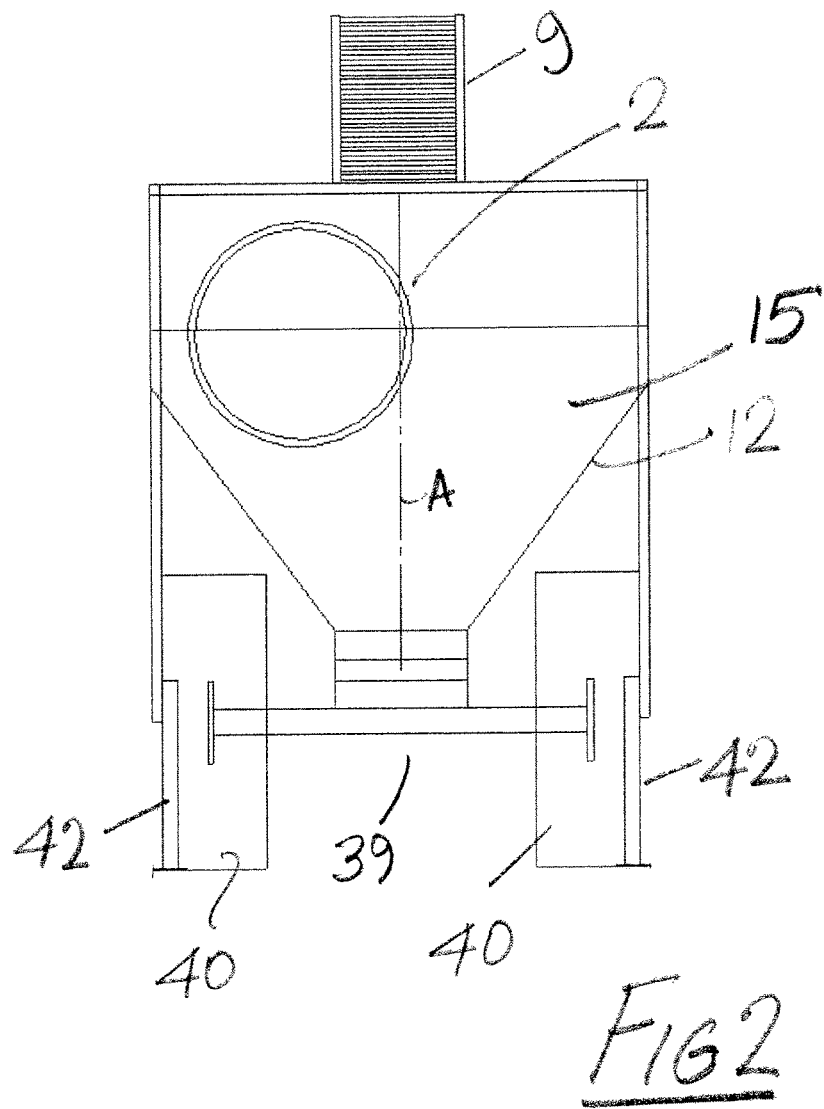
FIG. 2 is a detail elevational view of a stone separator forming portion of the root crop washer.
Figure 3:
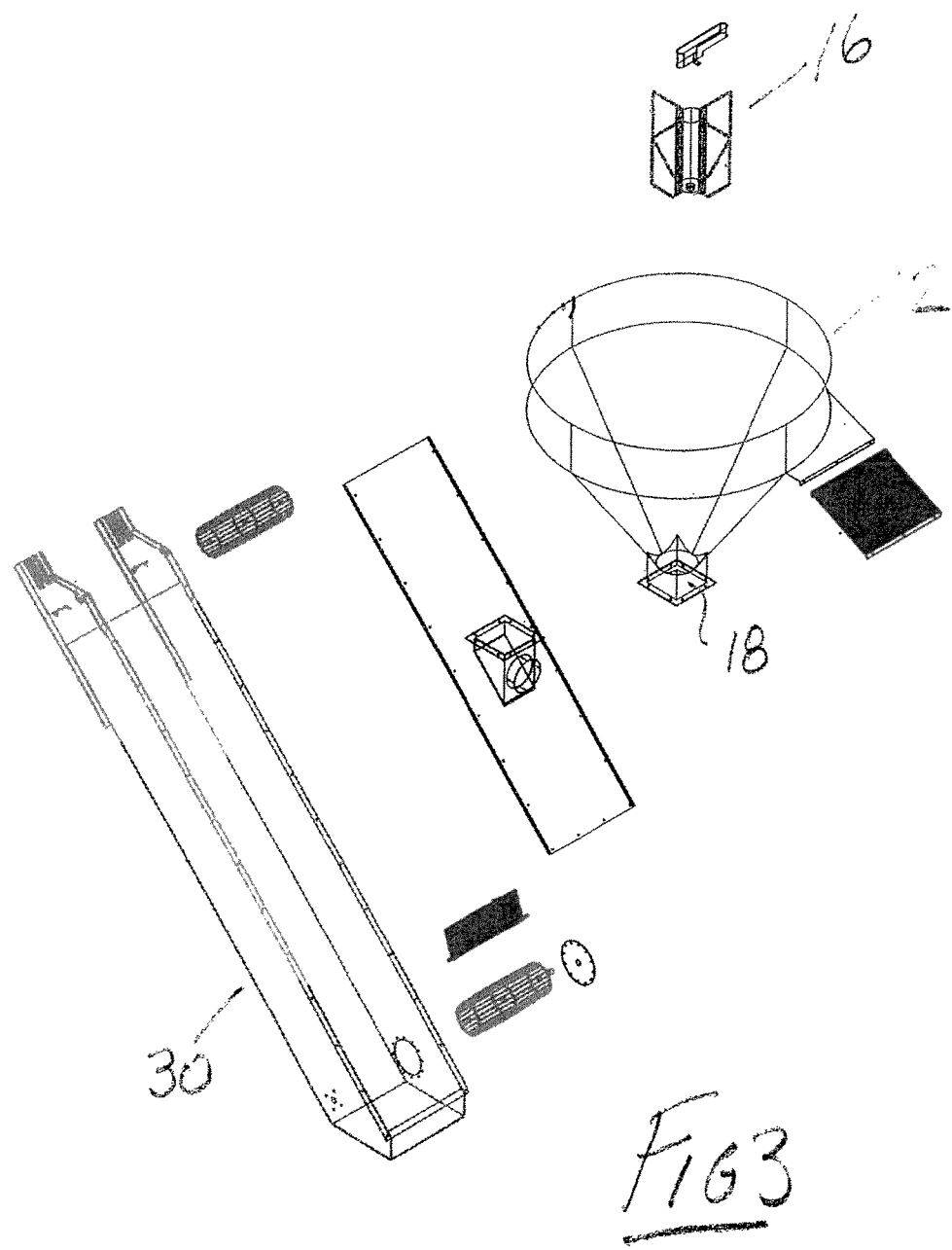
FIG. 3 is a detail exploded view showing portion of the root crop washer.

Referring to the drawings and initially to FIGS. 1 to 3 thereof, there is illustrated a root crop washer according to the invention indicated generally by the reference numeral 1. The root crop washer 1 has a rotatable washing drum 2 which is partially immersed in a water trough 3 and a stone separator 4 mounted before an inlet 5 of the washing drum 2. The washing drum 2 is largely similar to the washing drum described in EP 0568489 and needs no further description here. In accordance with the present invention, the stone separator 4 comprises a cyclonic separator. A loading hopper 7 is provided for delivery of a root crop such as beet, turnips, or potatoes to the stone separator 4. An elevator 9 is mounted at an outlet 10 of the washing drum 2 for discharge of cleaned produce from an outlet of the washing drum 2.

The cyclonic separator 4 comprises a frusto-conical container forming a separator housing 12 having a side wall 15 which narrows between a top 13 and a bottom 14 of the separator housing 12. A set of paddles 16 is rotatably mounted within the separator housing 12 and is operable to impart a swirling motion to water within the separator housing 12 such that the water swirls about a central vertical axis A of the separator housing 12. An open waste outlet 18 is provided at a bottom of the separator housing 12 for discharge of stone and clay material from the separator housing 12.

A water pump 20 mounted within the trough 3 or at a side of the trough 3 has an inlet communicating with the trough 3 interior and an outlet which discharges pressurised water through the waste outlet 18 and into an interior of the separator housing 12. Thus, operation of the water pump 20 creates a water stream flowing upwardly through the separator 12 which overflows at an outlet 22 at the top 13 of the separator housing 12 back into the trough 3. Rotation of the paddles 16 also imparts a swirling motion to the water generating a vortex within the separator housing 12 and thus root crops such as potatoes and beet are sufficiently supported by the water within the housing 12 and are moved around the side wall 15 of the separator housing 12 between a crop inlet 25 and the outlet 22 which discharges the produce into the washing drum 2 with the overflow water. While the root crop is supported by the upwardly travelling water and is thrown outwardly towards the side wall 15 of the separator housing 12 by centrifugal action stones and heavy clay material drop through the water in the separator housing 12 to the waste outlet 18 at the bottom of the separator housing 12.

A waste conveyor 30 is mounted at a bottom of the trough 3 and passes beneath the outlet 18 to carry away stone and clay material which drops through the outlet 18. As can be seen in FIG. 1 the conveyor 30 has a discharge end 32 which projects outwardly of the trough 3 at a front end of the trough 3 for discharging the clay and stone waste material from the trough 3.

The elevator 9 may be a folding elevator as shown in FIG. 1, the elevator 9 folding about a hinge 36 intermediate its ends between a raised in-use position and a downwardly depending folded position for storage and transport. A chopper 38 is provided at an outer end of the folding elevator 9. This chopper 38 is hingedly mounted at the end of the elevator 9 and can be swiveled to one side if it is not desired to chop the produce.

The trough 3 is mounted on a chassis 39 supported on wheels 40 to facilitate towing behind a tractor vehicle. Hydraulically operable stabilising legs 42 on the chassis 39 can be lowered to the ground to stabilise the apparatus in use. It will be noted that both the elevator 9 and the waste conveyor 30 are oriented in a longitudinal direction on the chassis 39 and the elevator 9 is mounted above the waste conveyor 30. This advantageously provides a compact construction suitable for transport on public roads.

The various rotating elements and conveyors can be conveniently hydraulically driven and powered by the power take off of a tractor vehicle.

In use, the trough 3 is filled with water to the normal operating water level W. The water pump 20 is operated to deliver water up through the separator housing 12 and overspill through the outlet 22 back into the trough 3, and the paddles 16 impart a swirling motion to the water within the separator housing 12. The paddles 16 generate a first liquid stream within the separator housing 12 travelling between the root crop inlet 25 and the root crop outlet 22. The pump 20 generates a second liquid stream within the separator housing 12 travelling upwardly through the separator housing 12. A root crop such as beet or potatoes is loaded into the hopper 7. A certain amount of loose stones and clay material will drop through spaced-apart bars 43 of the loading hopper 7. Beet or the like discharged from the loading hopper 7, falls through the inlet 25 of the separator housing 12. The beet is carried on the water stream and swirled about the separator housing 12 towards the outlet 22. At the same time heavy materials such as stone and clay will drop through the water in the separator housing 12 to the waste outlet 18 from where it is removed by the waste conveyor 30. Beet discharged from the outlet 22 of the separator housing 12 is fed into the washing drum 2 where it is washed and discharged onto the elevator 9.

Referring now to FIGS. 4 to 11, there is illustrated another root crop washer according to a second embodiment of the invention indicated generally by the reference numeral 50. This is largely similar to the root crop washer described previously and like parts are assigned the same reference numerals.

Figure 4:
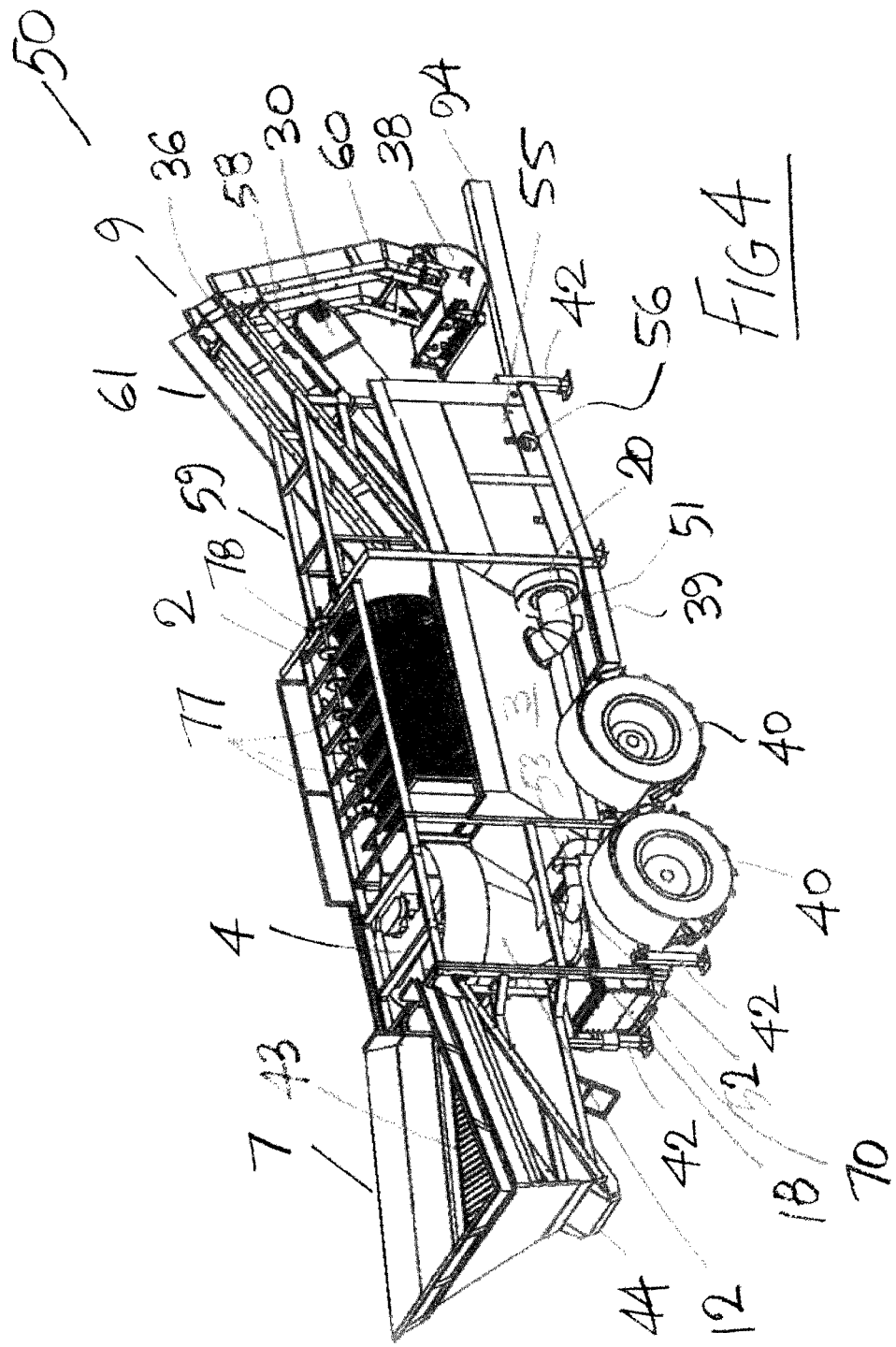
FIG. 4 is a perspective view of another root crop washer according to the invention.
Figure 5:
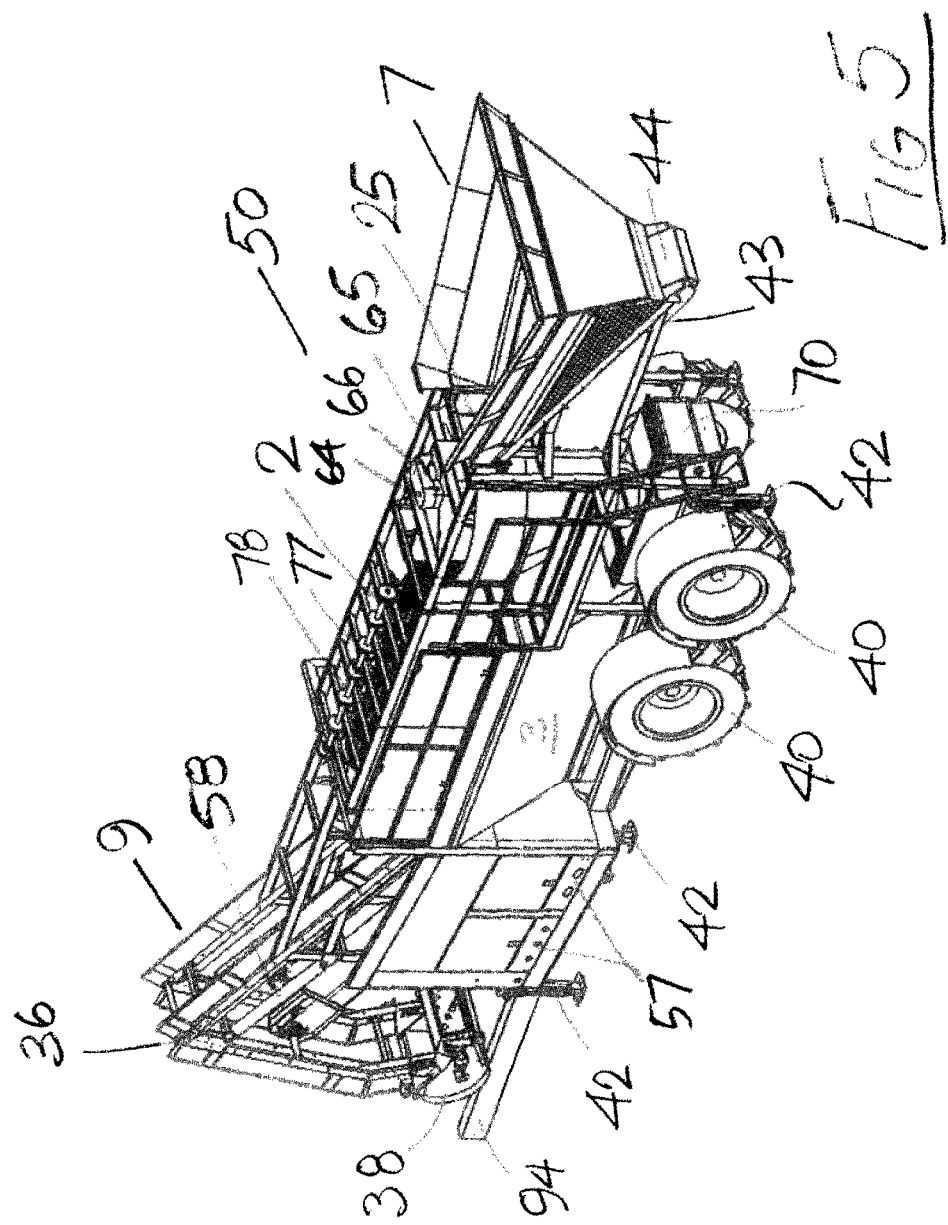
FIG. 5 is another perspective view of the root crop washer shown in FIG. 4.

Referring initially to FIGS. 4 and 5, the water pump 20 is shown mounted outside the trough 3. A water suction pipe 51 connects between the water trough 3 and an inlet of the pump 20. An outlet of the pump 20 discharges through a water feed pipe 52 to the waste outlet 18 at the bottom of the separator housing 12. A flow control valve 53 is mounted in the water feed pipe 52 to control the water stream delivered up through the separator housing 12 by the pump 20.

An hydraulic pump 55 is mounted at a front end of the chassis 39 together with an associated PTO (power take-off) input drive 56 for operation of the hydraulic pump 55. At an opposite side of the chassis 39 are various controls 57 for regulating operation of the various hydraulic rams, motors and the like of the root crop washer 50. Hydraulic rams 58 extend between a support frame 59 on the chassis 39 and an outer section 60 of the elevator 9 for raising and lowering said outer section 60 relative to an associated inner section 61 of the elevator 9. Thus, the outer section 60 can be folded into a downwardly depending transport position as shown in FIGS. 4 and 5 when not in use.

Figure 6:
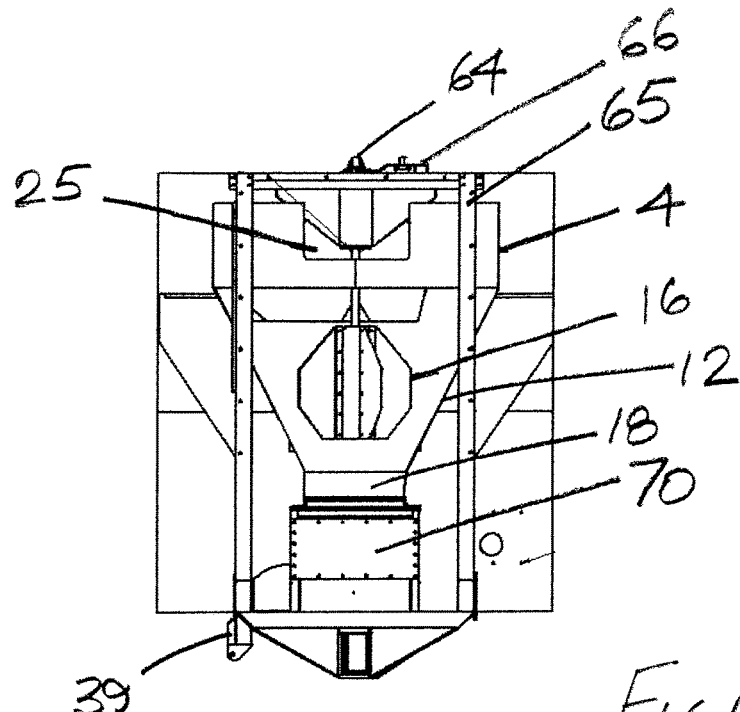
FIG. 6 is a detail elevational view of a destoner forming portion of the root crop washer of FIG. 4.

Referring in particular to FIG. 6, the paddles 16 are suspended within the separator housing 12 on a rotor drive shaft 64 which is mounted on a support frame 65 on the chassis 39. An hydraulic drive motor 66 is drivably connected to the rotor drive shaft 64 for rotation of the rotor drive shaft 64 and hence the paddles 16 within the separator housing 12.

Figure 7:
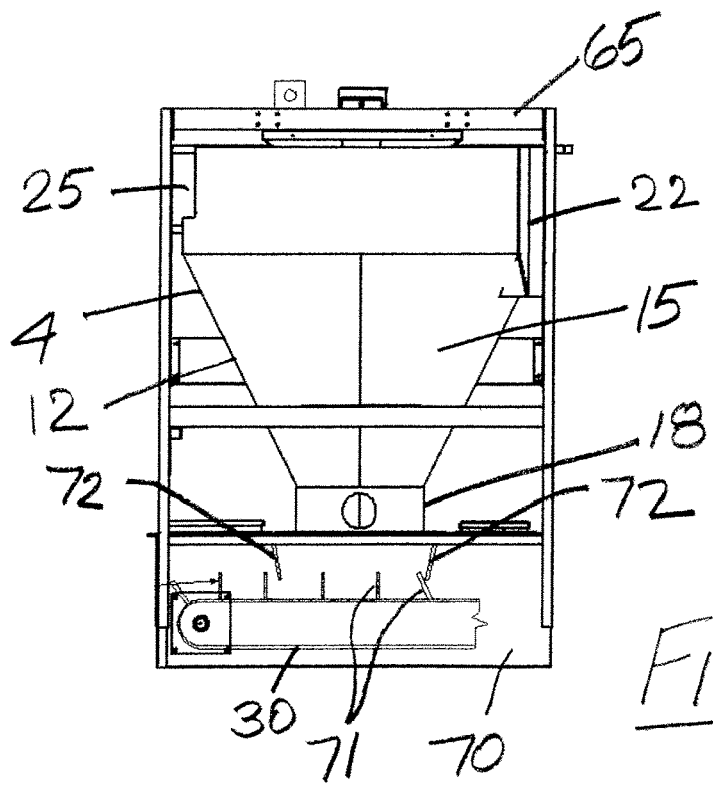
FIG. 7 is a side elevational view of the destoner shown in FIG. 6.

Referring in particular to FIGS. 4 and 7, the waste conveyor 30 is mounted within a casing 70 directly below the separator housing 12 and forming an extension of the water trough 3. The waste conveyor 30 has outwardly extending spaced-apart paddles 71 to engage and remove debris falling through the waste outlet 18 of the separator housing 12. Cyclone water restrictor flaps 72 extend downwardly at the waste outlet 18 and the paddles 71 are deflectable as shown in FIG. 7 to pass beneath said water restrictor flaps 72.

Figure 8:
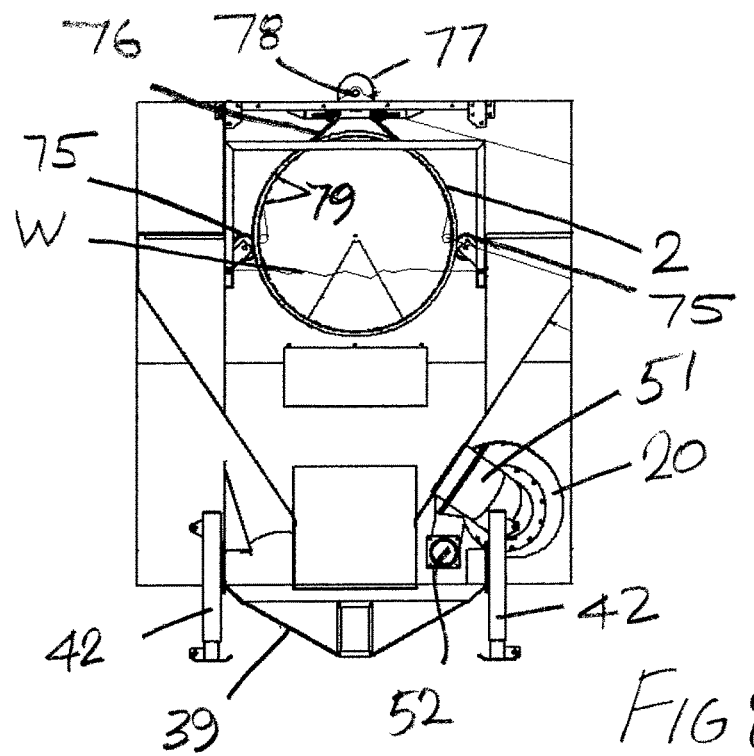
FIG. 8 is a detail elevational view of a washer forming portion of the root crop washer of FIG. 4.

FIG. 8 shows the washing drum 2 supported on rollers 75. A number of spaced-apart associated drive belts 76 each engage about the washing drum 2 and an associated overhead drive pulley 77 mounted on an elongated longitudinal drive shaft 78 which is operable for rotation of the washing drum 2. The drum 2 has a number of circumferentially spaced-apart longitudinal slats 79 which retain the root crop, but allow through-passage of water from the trough 3.

Referring in particular to FIG. 9, the waste conveyor 30 is shown mounted on the chassis 39. As can be seen the waste conveyor 30 has a horizontal section 80 at a rear end of the chassis 39 and an upwardly inclined forward section 81 at a front end of the chassis 39. It will be noted that this forward section 81 nests below the inner section 61 of the elevator 9 as shown in FIGS. 4 and 5. An opening 82 is provided in a top of the casing 70 for alignment with the outlet 18 of the separator housing 12.

Figure 10:
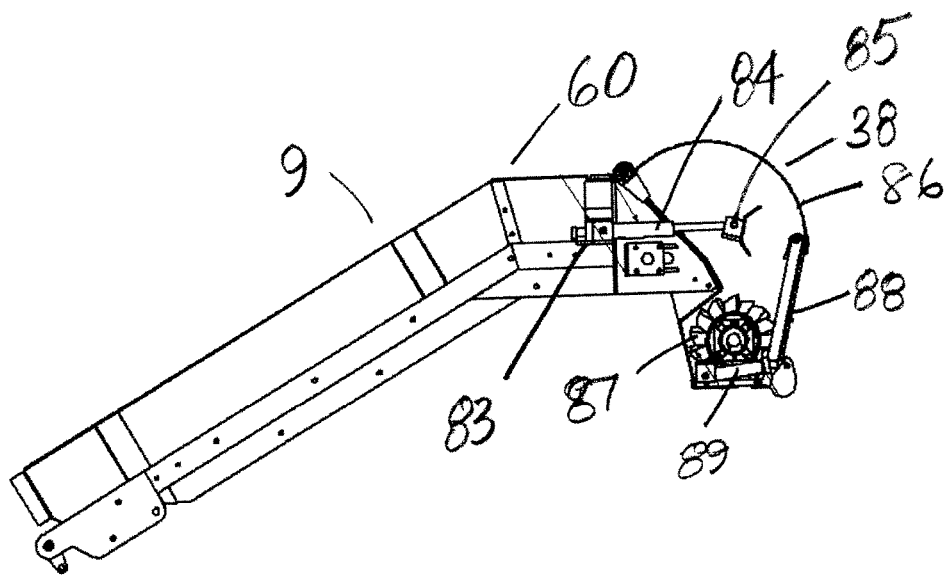
FIG. 10 is a detail, partially-sectioned, side elevational view of an elevator forming portion of the root crop washer of FIG. 4.

FIG. 10 shows the outer section 60 of the elevator 9. A ram 84 engages between a mount 83 at an outer end of the elevator 9 and a mounting bracket 85 on the chopper 38 and is operable for swiveling the chopper 38 between an in-use position as shown in FIG. 10 and a disengaged position when not required for use leaving an outlet end of the elevator 9 open. The chopper 38 essentially comprises a chopper box 86 within which are mounted hydraulically operated rotating chopper blades 87. A hinged door 88 is provided on the chopper box 86 and is controlled by an associated hydraulic ram 89.

Referring now in particular to FIG. 11, the chassis 39 is shown in more detail. The chassis 39 has two spaced-apart substantially parallel chassis rails 90 interconnected by a number of spaced-apart cross members 91. A draw-bar 94 is telescopically mounted within an associated tubular sleeve 95 at a front end of the chassis 39. Thus, the draw-bar 94 can be extended for towing and can be retracted within the sleeve 95 when the apparatus is in operation. An hydraulic retaining pin 96 is engagable through the sleeve 95 with the draw-bar 94 to secure the draw-bar 94 in the extended position for towing.

In use, with the draw-bar 94 extended and the elevator 9 in the collapsed stored position as shown in FIGS. 4 and 5, the root crop washer 50 can be readily towed behind a vehicle to any desired location for use. When on site, the outer section 60 of the elevator 9 is raised by the rams 58 into the in-use position. The PTO of a tractor or the like is connected to the PTO input drive 56 to drive the hydraulic pump 55 to supply power to the hydraulic system for operation of the various rams, stabilisers and motors. As previously described, a root crop delivered to the loading hopper 7 is discharged by a loading conveyor 44 at a bottom of the loading hopper 7 through the inlet 25 into the stone separator 4 where the root crop is carried between the inlet 25 and the outlet 22 by the swirling water within the separator housing 12. Clumps of dirt and stones fall through the separator housing 12 to the outlet 18 where they are discharged onto the waste conveyor 30 for removal. The produce is cleaned in the washer drum 2 and then discharged by the elevator 9.

Referring now to FIG. 12 there is shown another root crop washer indicated generally by the reference numeral 100. This root crop washer 100 is largely similar to the root crop washers described previously and like parts are assigned the same reference numerals. In this case, the chassis 39 forms a semi-trailer for connection to the fifth wheel coupling of a tractor vehicle 102 for transport. In this case also an engine and hydraulic pumps 103 may be mounted at a front end of the chassis 39 together with an associated hydraulic oil tank and fuel tank 104. Thus, in this case, the root crop washer 100 has its own power supply. A PTO input drive connection may also be provided if desired to provide an alternative power source.

The invention is not limited to the embodiments hereinbefore described which may be varied in both construction and detail within the scope of the appended claims.

The invention claimed is:

1. A root crop washer including a root crop washing apparatus and a stone separator mounted at an inlet of the root crop washing apparatus, the stone separator comprising a frusto-conical separator housing having a side wall which narrows between a top and a bottom of the separator housing, the separator housing having a root crop inlet and a root crop outlet spaced-apart from the root crop inlet at a top of the separator housing, the root crop outlet communicating with the inlet of the root crop washing apparatus, a first liquid stream generator for generating a first liquid stream within the separator housing travelling between the root crop inlet and the root crop outlet for delivery of the root crop from the inlet to the outlet, said first liquid stream generator comprising a vortex generator for swirling liquid within the separator housing for generating a vortex within the separator housing, said first liquid stream generator comprising set of paddles rotatably mounted within the separator housing and operable to impart a swirling motion to water within the separator housing such that the water swirls about a central vertical axis of the separator housing to support the root crop falling through the root crop inlet and swirl the root crop around the side wall of the separator housing between the root crop inlet and the root crop outlet for discharge into the root crop washing apparatus, and the stone separator further includes a second liquid stream generator for generating a second liquid stream within the separator housing travelling upwardly through the separator housing, wherein the separator housing has a waste outlet at a bottom of the separator housing, a waste removal conveyor is mounted below the waste outlet, and the waste removal conveyor is mounted within a water trough, said waste removal conveyor having an outlet end for discharge of material carried by the conveyor outwardly of the water trough.

2. The root crop washer as claimed in claim 1, wherein the first liquid stream generator comprises a paddle mounted on a rotor shaft within the separator housing, said rotor shaft being connected to a drive motor for rotation of the paddle within the separator housing for swirling liquid within the housing to form the first liquid stream.

3. The root crop washer as claimed in claim 1, wherein the second liquid stream generator comprises a pump operable to circulate liquid upwardly through the separator housing between a liquid inlet at a lower end of the separator housing and a liquid outlet at an upper end of the separator housing.

4. The root crop washer as claimed in claim 3 wherein the root crop outlet forms the liquid outlet.

5. The root crop washer as claimed in claim 3, wherein the root crop washer includes a trough forming a liquid reservoir, the trough having a liquid outlet communicating with an inlet of the pump and the liquid outlet of the separator housing communicating with the trough.

6. The root crop washer as claimed in claim 1, wherein the waste removal conveyor has outwardly extending spaced-apart paddles to engage and remove debris falling through the waste outlet.

7. The root crop washer as claimed in claim 6, wherein cyclone water restrictor flaps extend downwardly at the waste outlet and the paddles are deflectable to pass beneath said water restrictor flaps.

8. The root crop washer as claimed in claim 1, wherein the waste outlet of the separator housing forms the liquid inlet.

9. The root crop washer as claimed in claim 1, wherein the separator housing has a frusto-conical side wall which narrows between a top and a bottom of the separator housing.

10. The root crop washer as claimed in claim 1, wherein the washing apparatus comprises a rotatable washing drum which is partially immersed in the water trough, said washing drum having an inlet communicating with the root crop outlet of the separator housing.

11. The root crop washer as claimed in claim 10 wherein a common trough is provided for the waste conveyor and the washing drum.

12. The root crop washer as claimed in claim 10, wherein an elevator is mounted at an outlet of the washing drum.

13. The root crop washer as claimed in claim 1, wherein the root crop washing apparatus and the stone separator are mounted on a mobile chassis and the waste removal conveyor and elevator extend longitudinally on the chassis with the elevator mounted above the waste removal conveyor.

14. A root crop washer, comprising:

a root crop washing apparatus and a stone separator mounted at an inlet of the root crop washing apparatus, the root crop washing apparatus comprising a rotatable washing drum which is partially immersed in a water trough, the stone separator comprising a frusto-conical separator housing having a side wall which narrows between a top and a bottom of the separator housing, the separator housing having a root crop inlet and a root crop outlet spaced-apart from the root crop inlet at a top of the separator housing, said root crop outlet communicating with the inlet of the root crop washing apparatus, a set of paddles rotatably mounted within the separator housing and operable to impart a swirling motion to water within the separator housing such that the water swirls about a central vertical axis of the separator housing to support the root crop falling through the root crop inlet and swirl the root crop around the sidewall of the separator housing between the root crop inlet and the root crop outlet for discharge into the root crop washing apparatus, a water pump having an inlet communicating with the trough interior and an outlet for discharging pressurized water through a waste outlet at a bottom of the separator housing into an interior of the separator housing to create a water stream which flows up through the separator housing and which overflows at an outlet at a top of the separator housing back to the trough, wherein the separator housing has a waste outlet at a bottom of the separator housing, a waste removal conveyor is mounted below the waste outlet, and the waste removal conveyor is mounted within the water trough, said waste removal conveyor having an outlet end for discharge of material carried by the conveyor outwardly of the water trough.

* * * * *